Oct. 4, 1932.  E. SCHMIDT  1,881,135
TRACTOR WHEEL
Filed March 27, 1931   3 Sheets-Sheet 1

Inventor
E. Schmidt

By Clarence A. O'Brien
Attorney

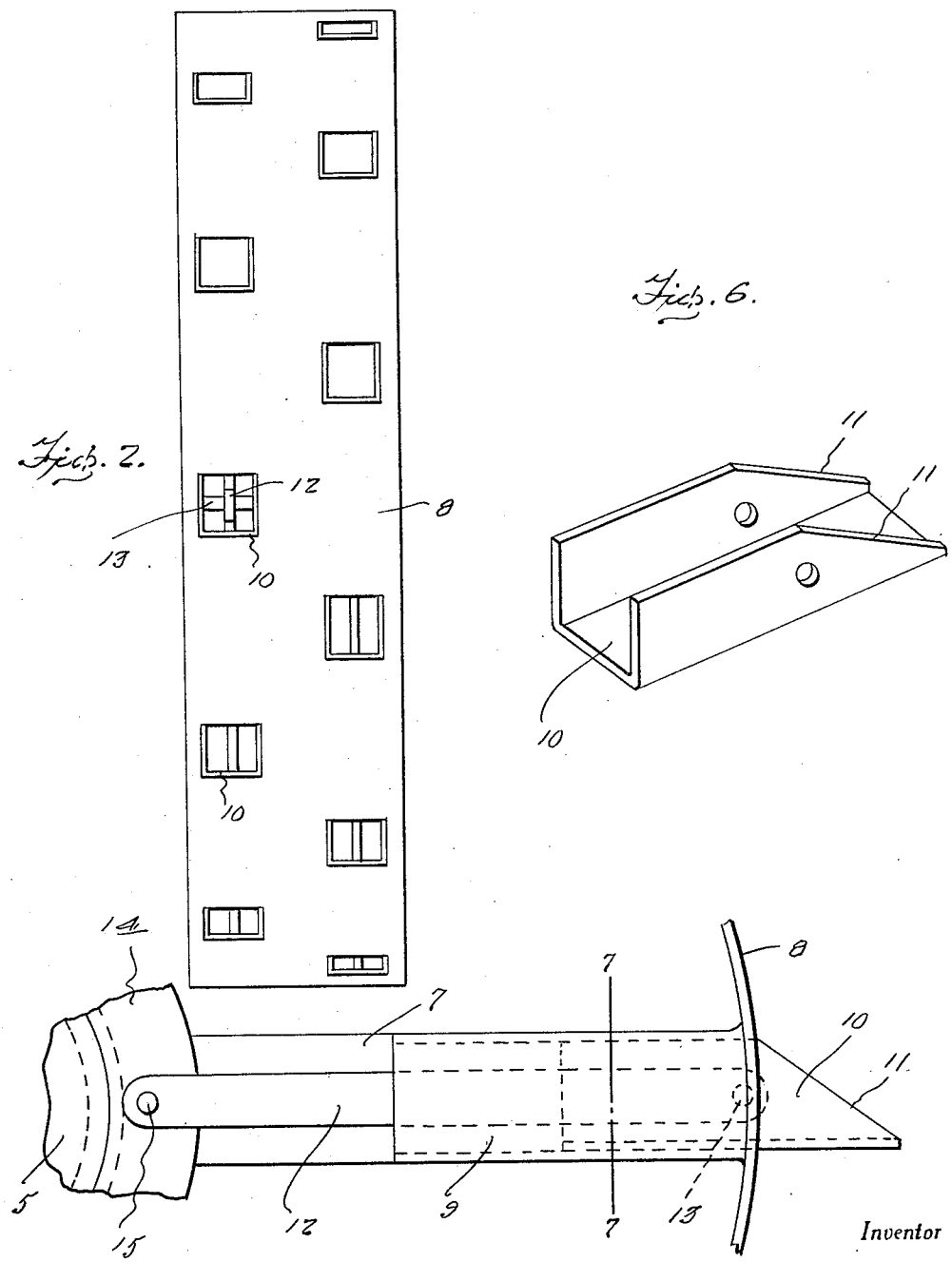

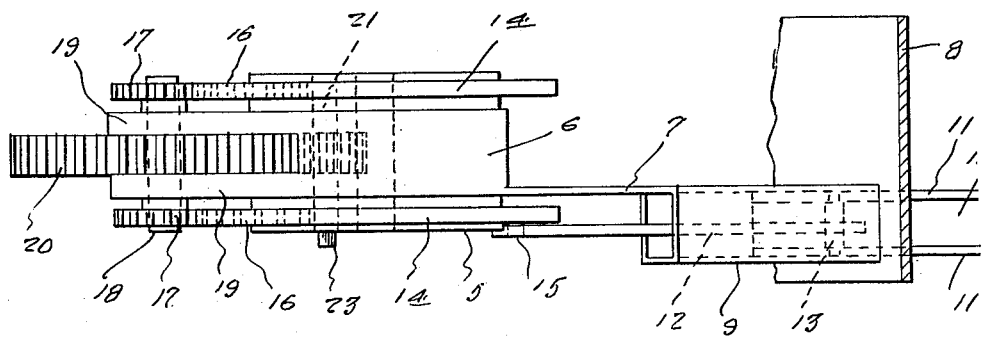
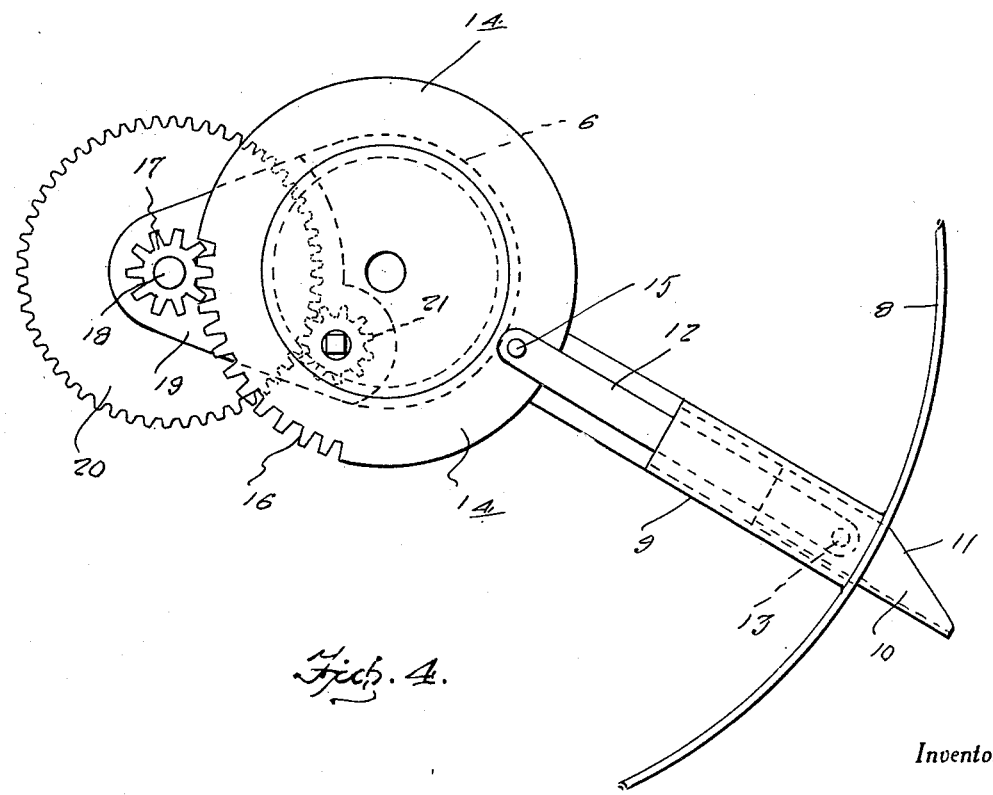

Patented Oct. 4, 1932

1,881,135

UNITED STATES PATENT OFFICE

EDWIN SCHMIDT, OF CATOOSA, OKLAHOMA

TRACTOR WHEEL

Application filed March 27, 1931. Serial No. 525,767.

This invention relates broadly to traction wheels, and has more particular reference to such type of traction wheel as is usually provided on farm tractors.

An important object of the present invention is to simplify and improve the construction of such traction wheels as are provided with traction lugs capable of being projected and retracted radially with respect to the axis of the wheel.

Other objects and advantages of the invention will be more apparent from a study of the following description, taken in connection with the accompanying drawings wherein:

Figure 2 is a plan view of the wheel periphery.

Figure 3 is a fragmentary detail elevational view for clearly illustrating the means for retracting and projecting the lugs, the rim being shown in section.

Figure 4 is a side elevational view of the structure shown in Figure 3.

Figure 5 is a detail elevational view for clearly illustrating a spoke and traction lug associated therewith.

Figure 6 is a perspective view of a traction lug.

Figure 1:
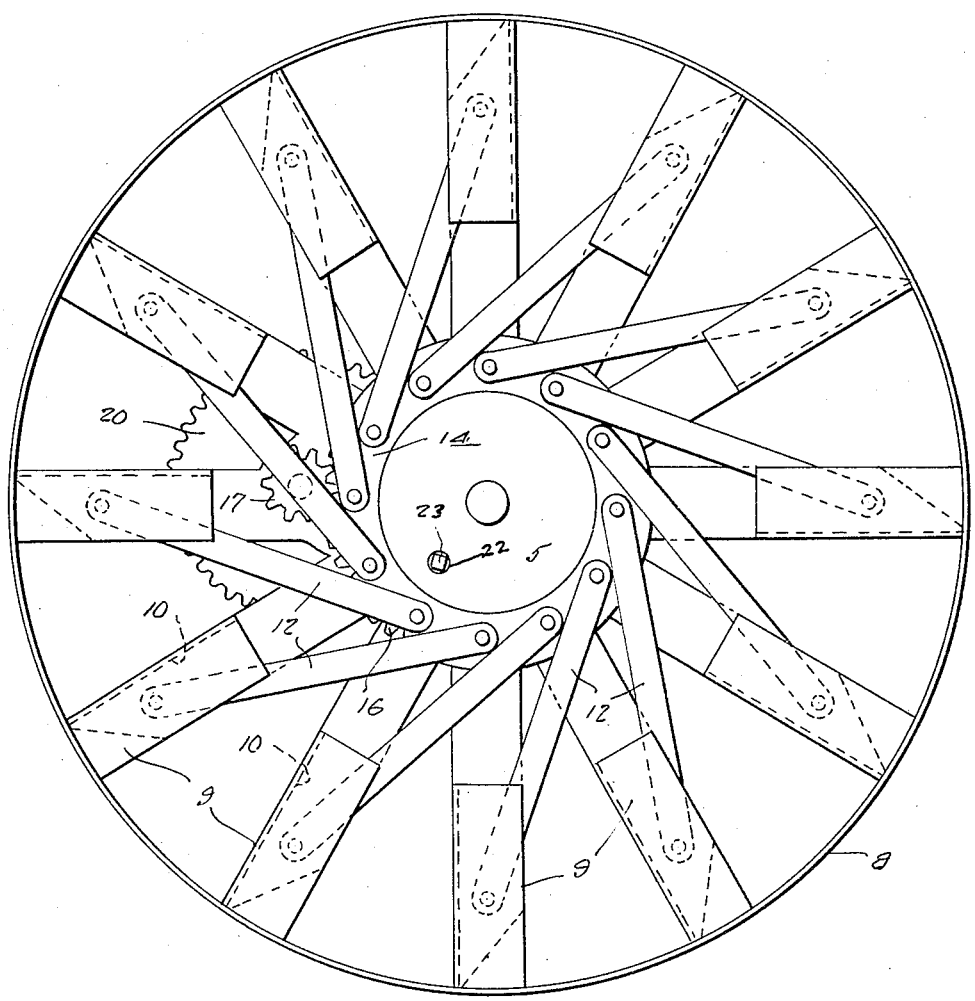
Figure 1 is a side elevational view of a traction wheel embodying the features of the present invention, the traction lugs being shown in retracted position.
Figure 7:
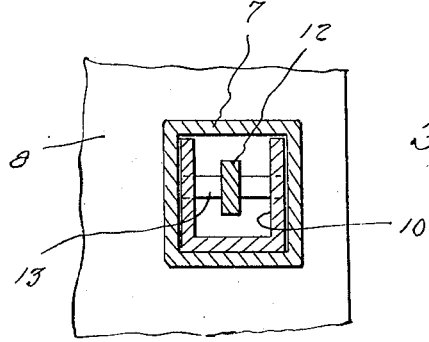
Figure 7 is a detail sectional view taken substantially on the line 7—7 of Figure 5.

With reference more in detail to the drawings, it will be seen that my improved traction wheel comprises a hub 5 having a fixed sleeve 6 disposed concentrically thereof. Sleeve 6 has integral therewith and projecting radially therefrom in staggered circumferentially spaced relation spokes 7 formed of metal or any other suitable and durable material. Spokes 7 at their outer ends are connected to a rim 8. Each of the spokes 7 adjacent its outer end is provided with an elongated guide sleeve 9. Slidably mounted in the sleeves 9 are traction lugs or grousers 10, and each of these grousers is formed preferably of metal and is channel shaped in cross section, opposite portions of the grouser or lug 10 at the ground engaging end thereof being beveled as at 11.

For each traction lug or grouser 10 there is provided a link 12 that at one end is pivotally engaged with a wrist pin 13 extending between the sides of the grouser or lug.

Disposed concentrically on hub 5 and arranged at opposite sides of sleeve 6 are adjusting rings 14 to which are pivotally engaged as at 15 the inner ends of the links 12. It is thought apparent, that the links 12 serve to retain the adjusting rings on the hub against outward axial movement relative to the hub, but of course it is to be understood that other additional means such as collars on the ends of the hub or the like may be utilized.

Each of the adjusting rings 14 is provided with a series of rack teeth 16 in mesh with pinions 17 provided on the ends of a shaft 18. Shaft 18 is journalled in a bifurcated arm or projection 19 integral with and extending radially from sleeve 6.

Splined to shaft 17 and operable within the furcations of arm 19 is a relatively large gear wheel 20 that is in mesh with a pinion 21 splined to a shaft 22 suitably mounted in the hub 5 in parallelism to the axis of the wheel. Shaft 22 at one end thereof is provided with a squared end 23 to facilitate engagement therewith of a suitable tool for rotating shaft 22.

As shown in Figure 2, the rim 8 opposite the outer end of each guide sleeve 9 is provided with an opening through which is slidable the ground engaging end of a grouser or lug 10.

In operation, to advance or retract the traction lugs or grousers 10, shaft 22 may be manually rotated and through the medium of the gearing described, rotative movement will be imparted to the adjusting ring 14 for advancing or retracting the lugs or grousers according to the direction of rotation of the ring. Manifestly, through the medium of the gearing, the grousers or lugs may be fully or partially projected or retracted as desired.

From a study of Figure 1, it will be noted that each of the guide sleeves 9 is slotted longitudinally to accommodate the link 12. It will be further noted, that the guides 9 are mounted on or are integral with the spokes of the wheel, thus providing for a stronger and more durable traction wheel that is obtained in those types of traction wheels that require guide means for the retractible lugs or grousers separate and apart from the spokes of the wheel. Further, it will be noted that when the lugs or grousers are in fully retracted position, the guides 9 are of suitable length as to provide a shield or casing for the retracted lugs, so that possible injury of the lugs becoming nicked, broken, or otherwise harmed, is reduced to a minimum. Further, the guide sleeves 9 being integral with the spokes 7 and the rim 8 provide reinforcement for the rim.

Even though I have herein shown and described the preferred embodiment of the invention, it is to be understood that the same is susceptible of changes, modifications and improvements coming within the scope of the appended claim.

Having thus described my invention, what I claim as new is:

A lug equipped traction wheel including in combination, a hub, a lug adjusting ring rotatably mounted on the hub, said hub being provided with a radial notch, a rotatable shaft extending axially through the hub and provided with a pinion arranged in said notch, a sleeve extending about said hub and fixed thereto, said sleeve having a bifurcated radial projection, a shaft rotatably supported by said projection and provided with a gear arranged between the arms of said bifurcations meshing with said pinion, and means for transmitting movement of the second-named shaft to said adjusting ring.

In testimony whereof I affix my signature.

EDWIN SCHMIDT.